United States Patent
Coady et al.

[11] Patent Number: 5,825,770
[45] Date of Patent: Oct. 20, 1998

[54] MULTIPLE ALGORITHM PROCESSING ON A PLURALITY OF DIGITAL SIGNAL STREAMS VIA CONTEXT SWITCHING

[75] Inventors: Alan Charles Coady, Ottawa; John Frank Pillar, Nepean; Jonathan David Loewen, Kanata, all of Canada

[73] Assignee: Northern Telecom Limited, Montreal, Canada

[21] Appl. No.: 659,395

[22] Filed: Jun. 6, 1996

[51] Int. Cl.⁶ .................................................. H04J 3/02
[52] U.S. Cl. .............................................. 370/378; 395/678
[58] Field of Search ................................. 370/357, 360, 370/375, 376, 377, 378, 379, 380, 381, 382, 383, 384, 385, 386, 387, 388, 466, 467, 476, 536, 540, 541, 465, 539; 395/677, 678, 670, 671, 672, 673, 674, 675, 676

[56] References Cited

U.S. PATENT DOCUMENTS

| | | | |
|---|---|---|---|
| 3,614,742 | 10/1971 | Watson | 395/678 |
| 4,382,278 | 5/1983 | Appelt. | |
| 4,958,342 | 9/1990 | Williams et al.. | |
| 4,970,714 | 11/1990 | Chen et al.. | |
| 5,127,098 | 6/1992 | Rosenthal et al. | 395/678 |
| 5,142,677 | 8/1992 | Ehlig et al. | 395/678 |
| 5,197,137 | 3/1993 | Kumar et al. | 395/678 |
| 5,237,564 | 8/1993 | Lespagnol et al. | 370/398 |
| 5,349,680 | 9/1994 | Fukuoka | 395/678 |
| 5,526,521 | 6/1996 | Fitch | 395/678 |

FOREIGN PATENT DOCUMENTS

| | | |
|---|---|---|
| 0 403 729 | 12/1990 | European Pat. Off.. |
| 0 405 726 | 1/1991 | European Pat. Off.. |

OTHER PUBLICATIONS

"A Mechanism for Efficient Context Switching", P.R. Nuth and W.J. Dally, IEEE Int'l Conference on Computer Design: VLSI in Computers & Processors, pp. 301–304, Oct. 14–16, 1991.

"Four Channel DS1 Framer", E.L. Parrella and S.M. Chang, IEEE Int'l ASIC Conference and Exhibit, pp. 445–448, Mar. 1994.

Primary Examiner—Huy D. Vu

[57] ABSTRACT

A technique of processing multiple digital signal streams uses one instantiation of an algorithm with memory storage of the next state, to facilitate context switching. In one embodiment, the invention is applied to framing and mapping techniques, resulting in a low circuit count for implementation with excellent performance, when measured with the commonly accepted criteria.

18 Claims, 5 Drawing Sheets

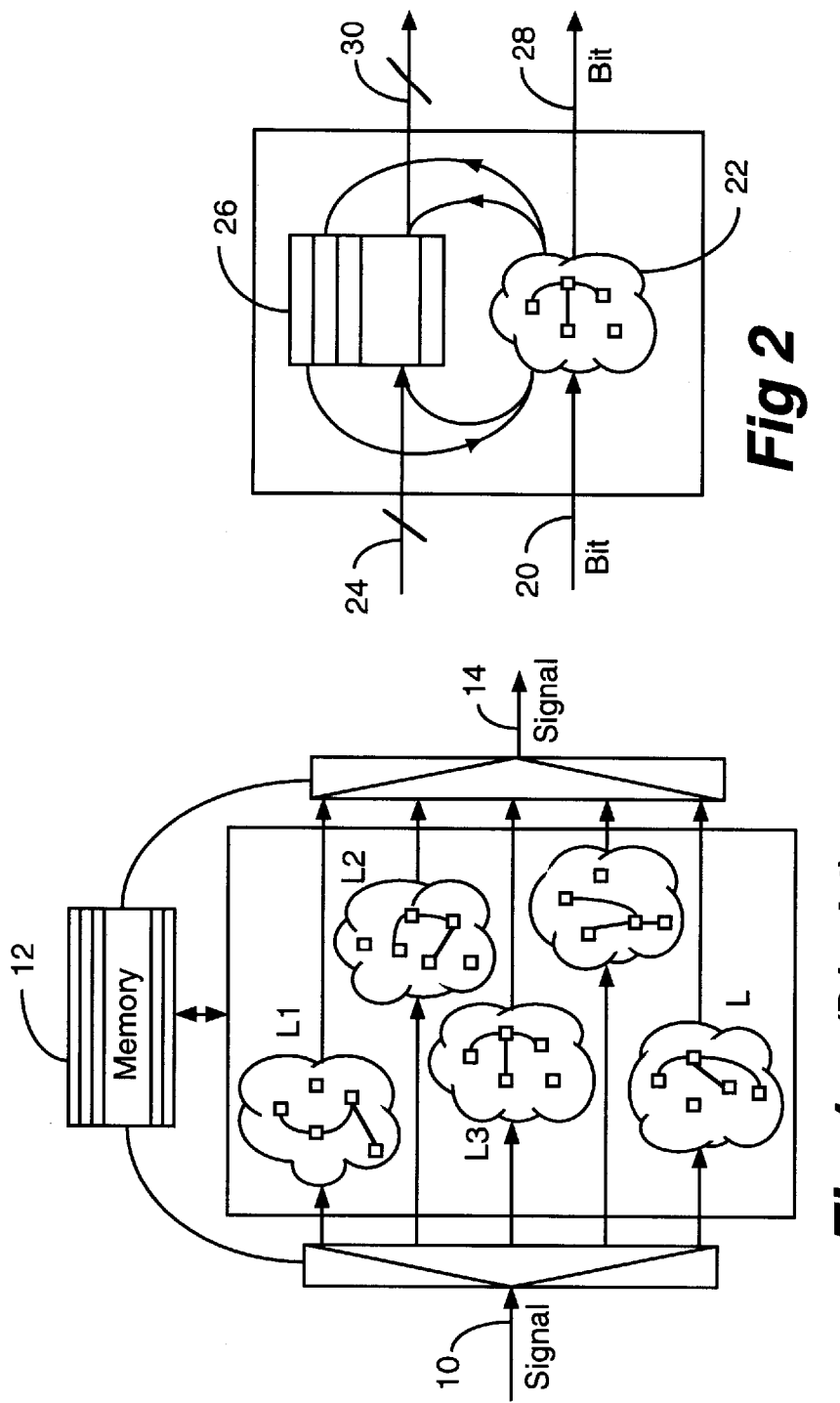

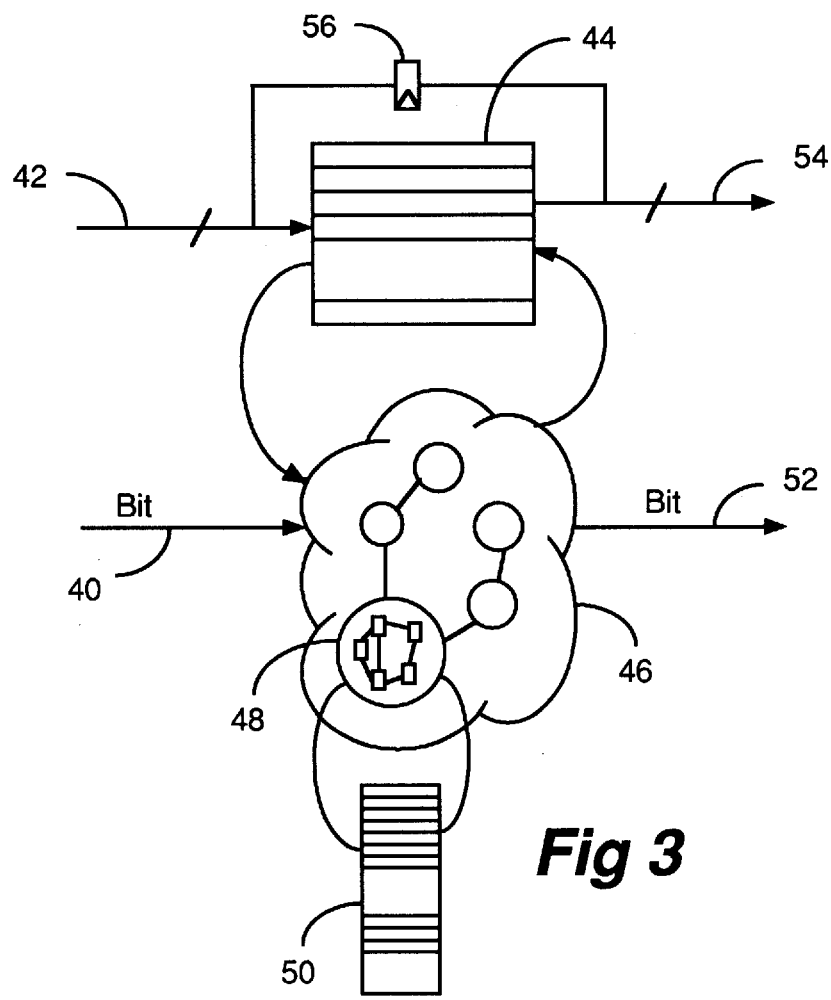

ND OF INVENTION

MULTIPLE ALGORITHM PROCESSING ON A PLURALITY OF DIGITAL SIGNAL STREAMS VIA CONTEXT SWITCHING

FIELD OF INVENTION

The invention relates generally to a technique of processing multiple digital signal streams through algorithms in a fast and efficient manner. The technique uses context switching with memory storage of next state, on a per digital signal stream basis, in order to minimize the circuit count of the device. In one particular embodiment, the invention finds application in the field of terminating multiple digital signal streams of a hierarchical digital signal level.

BACKGROUND OF INVENTION

In telecommunications or computer fields, there are many occasions on which one or more algorithms are executed more than once on a multiple of similar digital signal streams. In multi-tasking computers, context switching in which more than one different task is executed through different algorithms, is known. The state of an algorithm for each task is saved in a context memory. When the same task is called for, a logic block for the task executes the algorithm for a possible number of states, starting at the state restored from the memory. The updated state of the algorithm is saved in the memory. Thus, two or more different tasks are carried out in time-shared fashion. In U.S. Pat. No. 4,382,278, issued May 3, 1983, Appelt describes a hierarchical memory system of a computer which utilizes working registers and workspace cache registers for faster context switching. An article entitled "A Mechanism for Efficient Context Switching" by Nuth and Dally in IEEE International Conference on Computer Design: VLSI in Computers and Processors, pp 301–4, Oct. 14–16, 1991, also discusses the use of a context cache for more efficient context switching.

In telecommunications, multiplexing of digital signals is very prevalent. For example, as data processing speed increases, more and more slower speed digital signal streams are assembled together (multiplexed) and transported over a common medium. When they are time-multiplexed, they are usually put into a frame of a predetermined size within which each digital signal stream is assigned to a particular time slot in relation to the beginning of the frame. The delineation of a frame is indicated by a specially designed and accepted repeating bit-pattern, called a frame alignment pattern.

When a framed digital signal stream is terminated, in other words, when a digital signal stream is converted from one hierarchical digital signal level to another, several functions are performed. The functions include insertion and extraction of required signals, e.g., alarm, control, framing, FDL, robbing bits, stuffing bits, etc. The insertion is performed in the transmit direction and is called "mapping ", while extraction takes place in the receive direction and is called "framing ". For example, when a DS1 signal is terminated, a data stream must be mapped and additional signals may be inserted in the transmit direction. In the receive direction, framing occurs and all these signals must be extracted. A device which performs all these functions bidirectionally is called a DS1 framer/mapper (or simply a DS1 framer) and contains different logic blocks for different algorithms for these functions.

Known digital signal framer devices use independent dedicated logic to perform each of these functions on each digital signal stream separately. If a system specifies multiple digital signal streams then multiple framer devices are required, each executing the same framing, mapping and other algorithms independently from each other. This duplication of logic translates into consumption of board/IC real-estate.

U.S. Pat. No. 4,970,714 (Chen et al), issued Nov. 13, 1990, teaches a communication system for high speed transmission of data over a link, e.g., a fiber optic link between two terminals. The architecture and protocol permit the use of dedicated hardware such as state machines constructed of programmable array logic units, to synchronize the transmission and reception of data packets.

With the instantiation of dedicated logic for each signal stream, existing DS1 framers are economically restrained to a maximum of 4 DS1 bidirectional stream terminations per device. In a situation where 28 DS1s are to be multiplexed/demultiplexed to/from a DS3 data stream, with state-of-the-art devices, 7 DS1 framers would need to be employed on a board and a minimum of one device to multiplex/demultiplex the 28 DS1 streams to/from DS3.

An article by Eugene L. Parrella and Sin-Min Chang entitled "Four Channel DS1 Framer," IEEE International ASIC Conference and Exhibit, March 1994, introduces the concept of a state-machine based framing algorithm utilizing RAM as next state memory which is instantiated once for each DS1 stream. The article does not suggest context switched framing of multiple DS1 streams utilizing only one instantiation of logic. In fact, their framer chip contains four channels, each channel being equipped with an independent framer with its own framer logic block. Therefore, the DS1 framer device introduced in the article would not realize the gate count reduction and cost savings. Also, the article is not concerned with the mapping of digital signal streams.

U.S. Pat. No. 4,958,342 (Williams et al), issued Sep. 18, 1990, describes digital multiplexed interfaces which allow communication between a host computer and several microcomputers over a transmission line. The multiplexed interface includes an adaptive digital network interface which processes the multiplexed data serially, allowing flexibility in data framing and protocol information processing.

Among other things, the present invention achieves processing of a plurality of digital signal streams with less logic and therefore offers savings in IC/board real-estate/power/cost over the existing devices.

When it is applied to terminating digital signal streams, it realizes the ability to frame/map a greater number of digital signal streams in one device.

OBJECTS OF INVENTION

It is therefore an object of the present invention to provide a technique which processes multiple digital signal streams efficiently by using context switching with storage of next state.

It is another object of the present invention to provide a technique which processes multiple digital signal streams with one instance of logic and memory to facilitate storage of next state.

It is a further object of the present invention to provide a technique which terminates a plurality of digital signals using context switching.

It is yet another object of the invention to provide a technique of framing a digital signal using context switching.

It is still a further object of the invention to provide a method of and apparatus for processing multiple digital signal streams by using context switching.

SUMMARY OF INVENTION

Briefly stated, the invention resides in a telecommunications system in which a plurality of digital signal streams are processed according to an algorithm which comprises more than one state. According to one aspect, the invention is directed to a method of performing an algorithm on a plurality of digital signal streams. The method includes steps of executing the algorithm, one or more states at a time, on each digital signal stream in a time multiplexed manner and storing a context for each digital signal stream, which indicates the next state of execution of the algorithm for the digital signal stream. The method further includes steps of switching the contexts of the plurality of digital signal streams and repeating the above-mentioned steps for each digital signal stream.

According to another aspect, the invention is directed to a context switching apparatus in a telecommunications system in which a plurality of digital signal streams are processed according to an algorithm. The context switching apparatus comprises an algorithmic logic block for executing the algorithm on each digital signal stream in a time multiplexing manner and a memory for storing a context for each digital stream which indicates the next state of execution of the algorithm for the digital signal stream at a specific instance of execution. The context switching apparatus further includes a controller for switching the contexts of the plurality of digital signal streams.

BRIEF DESCRIPTION OF THE DRAWINGS

FIG. 1 is a functional block diagram of context switching in the multi-tasking computer environment;

FIG. 2 is a functional block diagram of context switching of a plurality of digital signal streams according to one embodiment of the invention;

FIG. 3 is a functional block diagram of context switching as applied to a plurality of digital signal streams and algorithms according to one embodiment of the invention;

DETAILED DESCRIPTION OF THE PREFERRED EMBODIMENTS OF INVENTION

Figure 4:
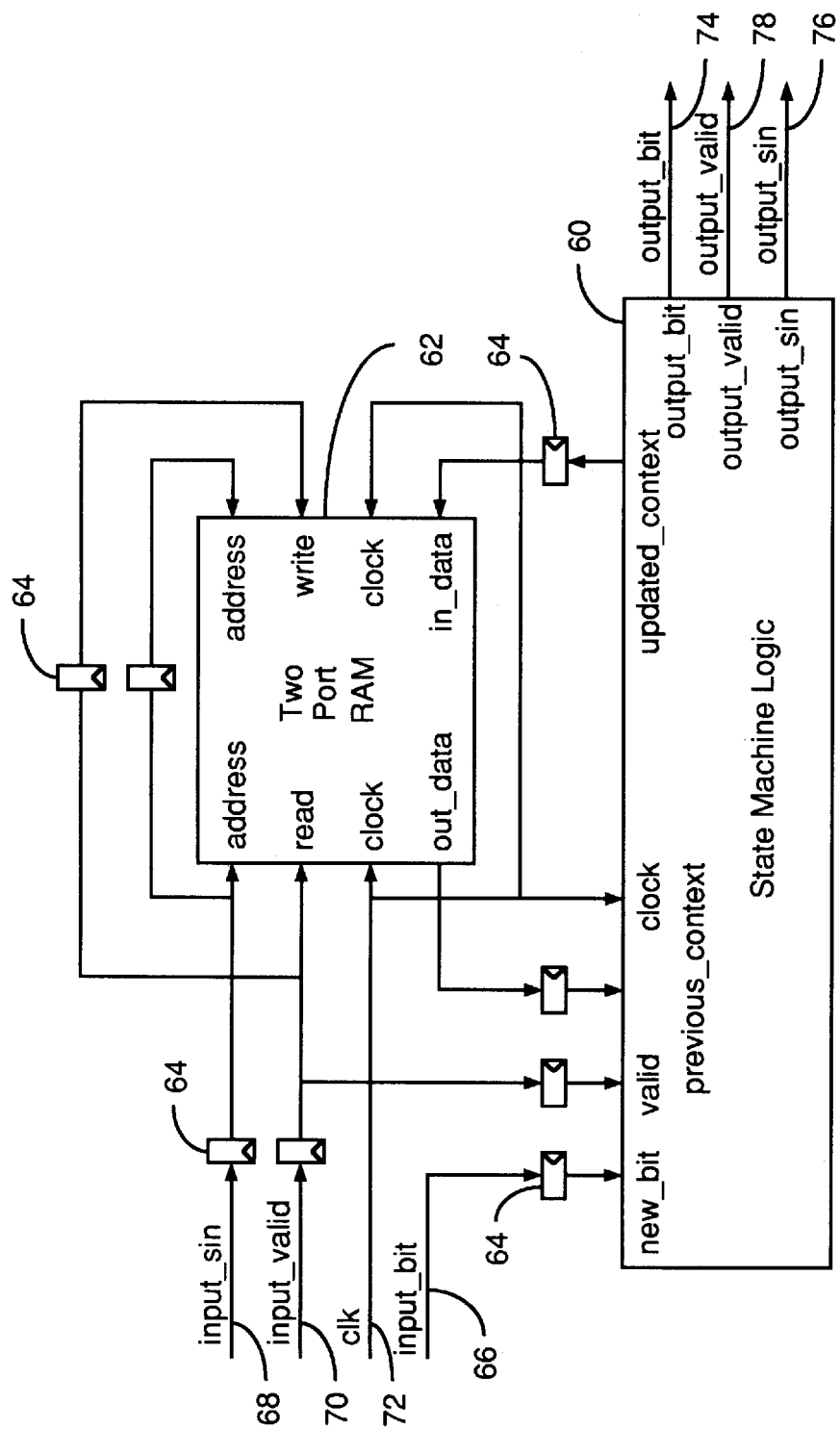
FIG. 4 is a schematic block diagram of a context switching apparatus as applied to terminating a plurality of digital signal streams of a digital hierarchical level according to one embodiment of the invention.

FIG. 1 is a conceptual diagram of known context switching. In the figure, there are multiple algorithms, L1, L2, L3 and so on, for different tasks which are prompted by input signals. The input signal is received on one signal stream 10 and is directed to an appropriate algorithm for execution. Via context switching, the next state of the algorithm is restored and the algorithm is executed on the input signal, Each algorithm is executed, by a processor or an algorithmic logic block designed for the task, to a certain stage and the next state of the algorithm is saved in a context memory 12. The processor or logic block executes each algorithm along its course and generates an output signal 14.

FIG. 2 is a brief functional block diagram of context switching according to one embodiment of the invention as applied to a plurality of digital signal streams. In the figure, the digital signal streams are fed serially through line 20 to a logic block 22 for algorithmic execution. Stream Identification Number (SIN) 24 identifies the digital signal stream to which the bit fed to the logic block belongs. The context stored in a memory 26 is retrieved from the location addressed by SIN and then the algorithm is executed on the received bit, after which the updated next state context is stored in memory 26. Output 28 is also a serial bit stream and output SIN 30 identifies the stream to which each output bit belongs.

In reality, often more than one logic function may be performed on each of a multiple of signal streams, some in sequence and some in parallel. As seen in FIG. 3, a group of algorithms are performed on an input bit. Therefore, when an input bit 40 belonging to a signal stream is received, the input SIN at 42 addresses a context memory 44. The next state for the group of algorithms 46 for a given signal stream is restored, and the algorithms are executed on the input bit. Meanwhile, one algorithm 48 in the group may be further context switched among multiple signal streams. Thus, a second context memory 50 stores the next state of the algorithm 48 for a given signal stream. When the input bit is received, the algorithm is executed, starting from the restored next state, and the updated context is stored in the second context memory. The output bit is produced at 52, together with its SIN at 54. As will be described in more detail, the multiple signal streams are pipelined and processed by algorithms in successive clock cycles, with the required delay of the SIN signal provided by buffer 56.

FIG. 4 is schematic data flow diagram for the context switched digital signal stream terminating system according to one embodiment of the present invention. The framer circuit is captured independently of the mapper circuit, but the context switching of the various digital signal steams is accomplished in the same manner for both circuits. Referring now to the figure, a framer includes a state machine logic block 60 and two-port RAM (storage) 62, together with latched pipeline stages 64 which buffer the signal for a certain number of clock cycles. The individual streams are received by the framer on a bit-by-bit basis via a time-division bit serial interface (input_bit) 66. To facilitate the unique identification of the bit-to-stream relationship for each bit transferred to the framer/mapper, a Stream Identification Number (input_sin) 68 must also be supplied. To indicate the validity of these two inputs, a qualifying signal (input_valid) 70 is monitored by the framer/mapper circuitry. The frequency of the clock signal (clk) 72 supplied to the framer/mapper circuitry must be at least equal to the aggregate of the bit rates of all the input streams. If the frequency of the clk is less than the total bit-rate of all the input streams, the framing/mapping circuit will not be able to process all the incoming bits, therefore it will fail to operate correctly.

The framed/mapped streams offered by the framer/mapper are presented to downstream logic in a time-multiplexed bit-serial manner across the signal line (output_bit) 74. An output Stream Identification Number (output_sin) 76 is driven by the framer/mapper circuitry to specify which stream the current bit on the output_bit line is associated with. To qualify the two output signals as valid, a third signal (output_valid) 78 is provided by the framer/mapper.

The context memory used to store the next state for the state machine based framing/mapping circuitry has a depth equal to the maximum number of unique streams the circuit is designed to frame/map. The width of the memory is determined by the number of bits required to store the entire context of the framer/mapper circuitry. To permit a single instance of framer/mapper logic to efficiently service multiple digital signal streams, pipelining must take place. This pipelining enables the context for one stream to be read from RAM, while at the same time a different stream is processed by the framer/mapper, and yet a third stream's context is written into the RAM. To process any given stream the following takes place.

The three input signals are latched, the validity of the input signals input_bit and input_sin is determined by the signal input_valid and, if valid, the context for the specified stream is read from next state RAM. In the next clk clock cycle, the context is loaded into the logic and the framing/mapping algorithm is performed on the pipelined input bit, input_bit. Next, state values are also determined in this clock cycle. In the third and last step, the new context for the stream is written to RAM. Since there is a possibility of processing a bit each clk clock cycle, the maximum aggregate bit rate is equal to the clock frequency of clk.

To obtain a near-theoretical minimum frame alignment recovery time, the simultaneous monitoring of each bit position of each stream for the frame alignment signal is performed. With stream context information retrieved and stored for each and every bit received by the framer logic, this continuous monitoring is not expensive. A small amount of framing context memory for each unique bit location and one instance of associated logic are all that is needed to ensure that frame alignment is declared as swiftly as possible.

Figure 5:
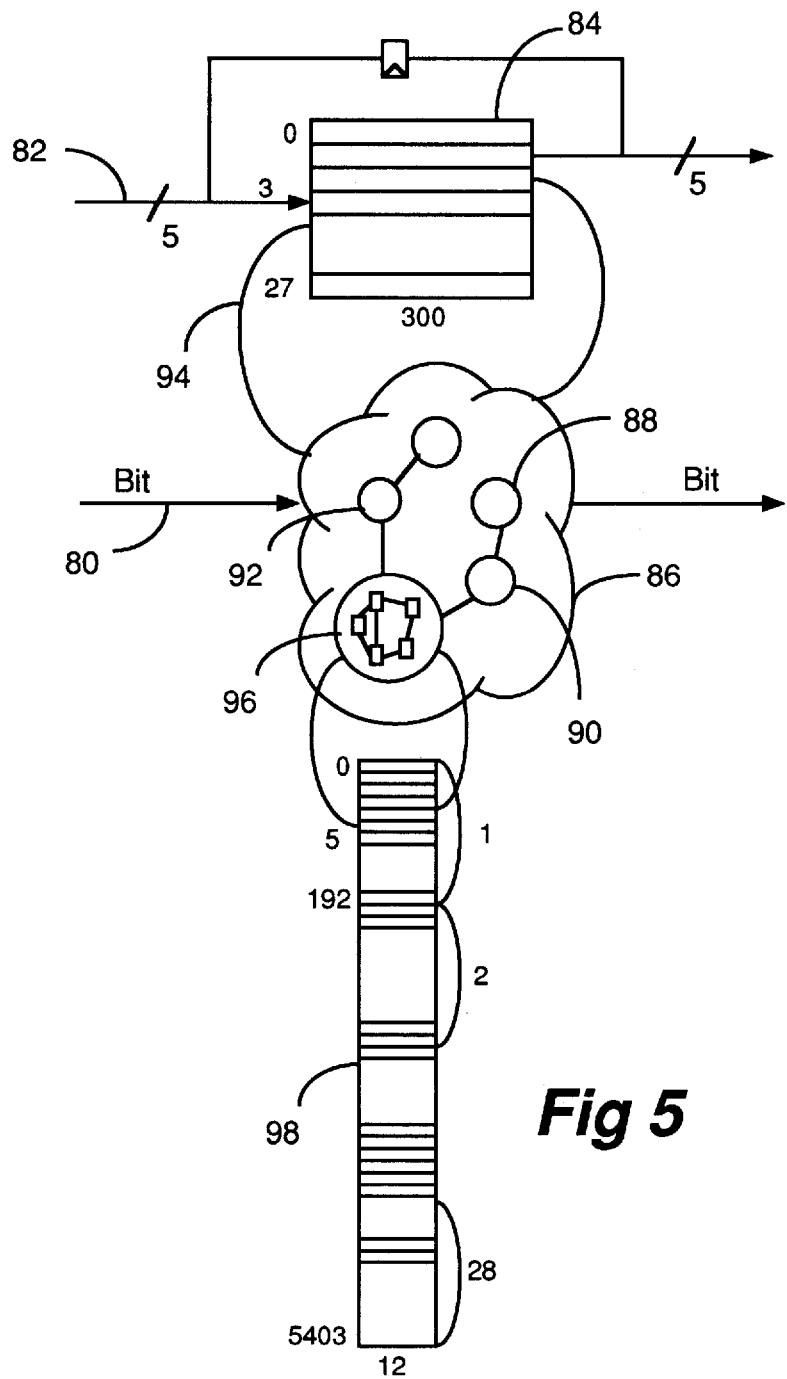
FIG. 5 is a functional block diagram of context switching, depicting the operation of a DS1 framer according to one embodiment of the invention.

The operation of the invention is illustrated in FIG. 5, which conceptually shows a DS1 framer block of one embodiment of the invention which terminates 28 DS1 signal streams. It should be noted that the example description which follows is applicable to DS1 framing in SF (Super Frame) mode only. Other DS1 modes such as ESF (Extended Super Frame), SLC™96, and T1DM require different framing algorithms. A data stream comes in at 80, one bit at a time. As an example, the input bit is Bit#5 of DS1#3 stream. Its SIN 82 identifies DS1 #3 stream and specifies the address of the first context memory 84, where the next state of a set of algorithms 86 for DS1 #3 is stored. As there are 28 DS1 streams, there are 28 locations in the first context memory 84. The memory is wide enough to represent the state of the algorithm set which includes multiple algorithms such as the control signal algorithm 88, FDL algorithm 90, alarm algorithm 92, etc. The context at address #3 is retrieved and the algorithm set is restored through 94 and executed. These algorithms are executed in series or in parallel. As for the framing algorithm 96, all 193 bit positions in one DS1 frame must be examined a certain number of times (e.g., 12) to see if one, and only one, of the bit positions exhibits the frame alignment pattern. The larger the number, the higher the degree of confidence. The first context memory stores an indication as to which of the 193 bit positions, for a given DS1 stream, the next bit to be received is associated with. The second context memory 98 stores the next state of the framing algorithm for this bit position. The second context memory 98 consequently contains {(28 DS1 streams)×(193 bit positions/DS1 stream)=} 5404 bit positions with a width of, for example, 12 bits to represent the state of the frame alignment algorithm for each bit of each DS1 stream. The next state stored for Bit#5 of DS1#3 stream is retrieved from the second context memory each time this bit position is encountered. Then, the algorithm is executed and the updated next state is saved in the second context memory. When the algorithm set is executed, the updated context for DS1#3 stream is saved in the first context memory. The operations are performed one bit at a time with pipelining, through the use of registers, to allow efficient use of logic and therefore increases the throughput to a theoretical maximum. As seen in the table that follows, in each clock cycle three operations, Read-Compute-Write, are simultaneously performed on three different DS1 streams, e.g., stream n+1, n, and n−1.

| Clock cycle Stream | 1 | 2 | 3 | 4 | 5 | 6 | 7 | 8 | 9 | 10 |
|---|---|---|---|---|---|---|---|---|---|---|
| Stream#1 | $R_1$ | $C_1$ | $W_1$ | | | | | | | |
| Stream#2 | | $R_2$ | $C_2$ | $W_2$ | | | | | | |
| Stream#3 | | | $R_3$ | $C_3$ | $W_3$ | | | | | |
| Stream#4 | | | | $R_4$ | $C_4$ | $W_4$ | | | | |
| Stream#5 | | | | | $R_5$ | $C_5$ | $W_5$ | | | |
| Stream#6 | | | | | | $R_6$ | $C_6$ | $W_6$ | | |
| Stream#7 | | | | | | | $R_7$ | $C_7$ | $W_7$ | |
| Stream#8 | | | | | | | | $R_8$ | $C_8$ | $W_8$ |

A read from memory for stream n+1 ($R_{n+1}$) is occurring, a compute for stream n ($C_n$) is taking place and a write to memory for stream n−1 ($W_{n-1}$) is being executed, all in the same clock cycle. It should also be clear from this example that each digital signal stream goes through a Read-Compute-Write sequence every 3 consecutive clock cycles.

Figure 6:
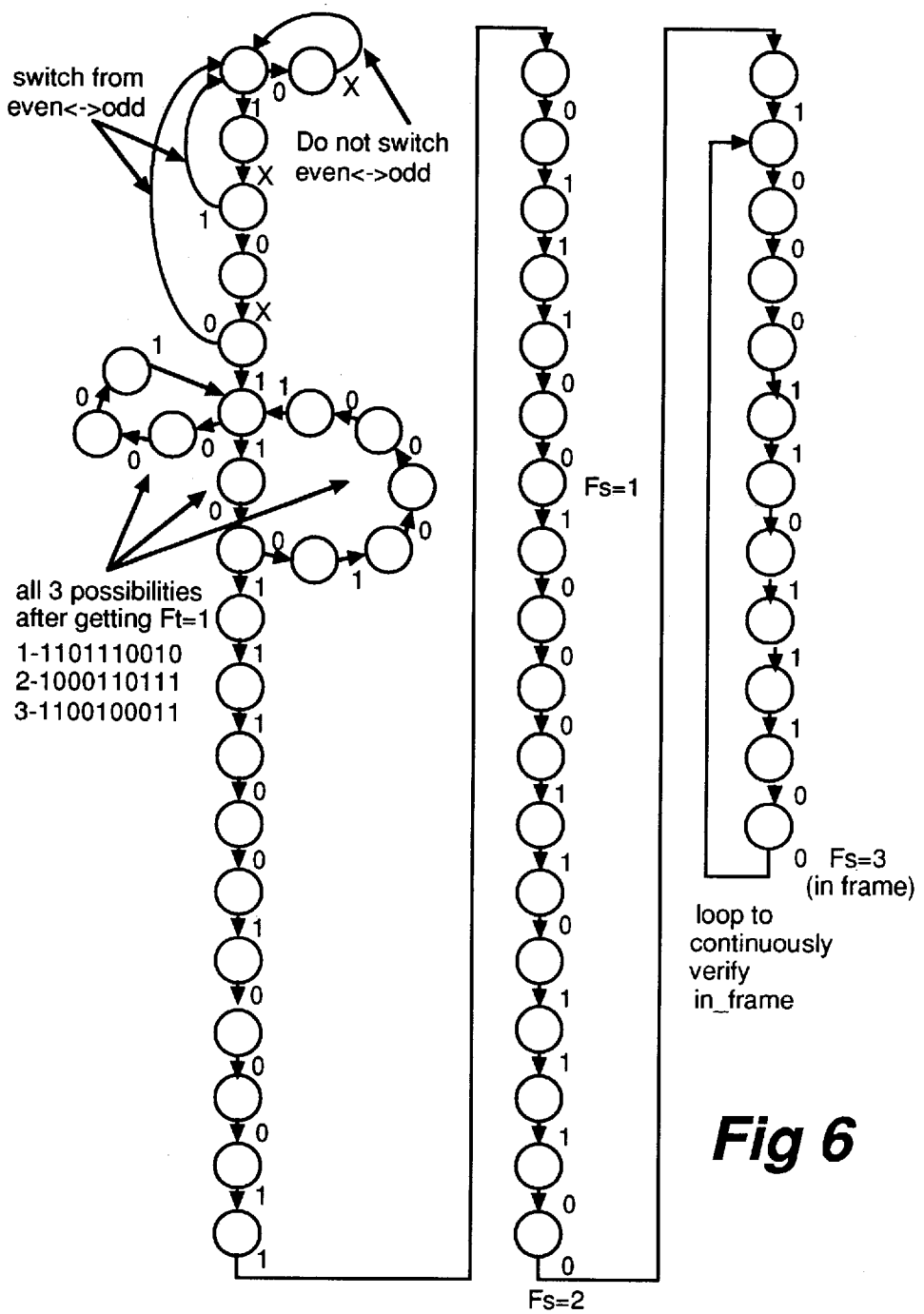
FIG. 6 is a block diagram of a state machine based DS1 digital stream framing algorithm according to one embodiment of the invention.

The DS1 Framer Block (DS1F) continuously looks at all 193 bit positions of a DS1 frame, for each of the 28 DS1 streams, and determines which of the 193 positions, for each DS1 stream, exhibits the frame alignment pattern. FIG. 6 shows the state machine of a DS1 SF framing algorithm according to one embodiment of the invention. It should, of course, be noted that because the same algorithm is executed on 193 bit positions per DS1, a separate state machine is provided to govern the switching among these 5404 positions. In DS1 SF, the frame pattern is made up of two interleaved series, Ft and Fs. Ft is a series of 101010, whereas Fs is a series of 001110. Thus the frame pattern is a repetition of 100011011100. Each of 193 bit positions in a frame is passed through the algorithmic logic block shown in FIG. 6, with associated next state context for each position being retrieved and stored from memory. As seen from the state machine diagram, there are several possible loops which bring the algorithm to a previous state. X indicates "don't care" and allows searching for Ft alignment while ignoring the Fs bit positions. Upon determining Ft alignment, the algorithm searches for Fs alignment, while maintaining Ft alignment, by going through any of the possible three loops. When Ft and Fs alignments are found, a verification stage is entered. This stage consists of one or more repetitions of the frame pattern before in-frame is declared. The number of repetitions determines the degree of confidence. After, and during, locating the frame alignment signal for each DS1 stream, the DS1 F block continues to monitor all bit positions of each DS1 stream for the frame alignment signal. This entails an off-line framer. In-frame is declared upon finding only 1 bit position of the 193 bit frame which exhibits the frame alignment pattern for a minimum predetermined number of frames. After frame alignment is constructed with respect to the bit position determined to exhibit the frame alignment signal, the frame alignment remains at that bit position until both that current frame alignment bit position no longer exhibits the framing pattern, and only one other bit position is determined to correctly exhibit the frame alignment signal.

To enable the DS1F block to continuously look at all incoming bits of all 28 DS1 streams, a context switched state machine is employed. The governing state machine context switches the states into, and out of, a dual port RAM with one instance of the state machine based framing logic. Therefore, the context memory contains 5404 memory locations. The clock supplied to the DS1F block is 50 MHz. This gives 20 ns per incoming bit for each of the Read, Compute and Write operations. As mentioned earlier, pipelining permits these three operations to be performed on each digital stream over three clock cycles.

What is claimed is:

1. In a telecommunications system in which a plurality of synchronously time division multiplexed digital signal streams are processed to convert between two levels of a digital signal hierarchy according to an algorithm which comprises more than one state, a method of performing the algorithm on the plurality of digital signal streams, comprising steps of:

(1) executing the algorithm, one or more states at a time, on each digital signal stream one bit at a time in a time multiplexing manner;

(2) storing a context for each digital signal stream, which context indicates the next state of execution of the algorithm for the digital signal stream;

(3) switching the contexts of the plurality of digital signal streams; and (4) repeating steps (1) to (3) for each digital signal stream.

2. The method according to claim 1 comprising a further step of:

(5) retrieving a previously stored context which indicates the next state of execution at the specific instance of execution for a digital signal stream.

3. The method according to claim 2 wherein the steps of storing a context, executing the algorithm and retrieving a previously stored context are performed for different digital signal streams in the same clock cycle.

4. The method according to claim 3 wherein step (1) comprises further step of:

(6) buffering all the digital signal streams and executing the algorithms for each digital signal stream one bit at a time in a time division multiplexing manner.

5. The method according to claim 2 wherein there is more than one algorithm and each of the algorithms is executed on each digital data stream, further comprising a step of storing a context for each digital signal stream, which context indicates the next state of execution of the one or more algorithms.

6. The method according to claim 3 wherein there is more than one algorithm and each digital data stream is processed by one or more algorithms, further comprising a step of storing a context for each digital signal stream, which context indicates the next state of execution of the one or more algorithms.

7. The method according to claim 4 wherein there is more than one algorithm and each digital data stream is processed by one or more algorithms, further comprising a step of storing a context for each digital signal stream, which context indicates the next state of execution of the one or more algorithms.

8. The method according to claim 5 wherein there is a set of two or more algorithms and each digital data stream is processed by the algorithms, further comprising steps of storing a first context for each digital signal stream, which first context indicates the next state of execution of the set of two or more algorithms, and storing a second context for each digital signal stream, which second context indicates the next state of any particular individual algorithm.

9. The method according to claim 6 wherein there is a set of two or more algorithms and each digital data stream is processed by the algorithms, further comprising steps of storing a first context for each digital signal stream, which first context indicates the next state of execution of the set of two or more algorithms, and storing a second context for each digital signal stream, which second context indicates the next state of any particular individual algorithm.

10. The method according to claim 7 wherein there is a set of two or more algorithms and each digital data stream is processed by the algorithms, further comprising steps of storing a first context for each digital signal stream, which first context indicates the next state of execution of the set of two or more algorithms, and storing a second context for each digital signal stream, which second context indicates the next state of any particular individual algorithm.

11. In a telecommunications system in which a plurality of synchronously time division multiplexed digital signal streams of the same or different digital hierarchies are processed to convert between two levels of a digital signal hierarchy according to a set of algorithms which comprise more than one state, a method of terminating the plurality of digital signal streams, comprising steps of:

(1) executing in series or in parallel the set of algorithms related to terminating the digital signal streams, one or more states at a time, on each digital signal stream one bit at a time in a time multiplexing manner;

(2) storing a context for each digital signal stream, which context indicates the next state of execution of the set of algorithms for the digital signal stream;

(3) switching the contexts of the plurality of digital signal streams; and (4) repeating steps (1) to (3) for each digital signal stream.

12. The method according to claim 11 wherein the set of algorithms includes a framing algorithm of the state machine type.

13. The method according to claim 12 further comprising steps of:

(1a) executing in series or in parallel the framing algorithm, one or more states at a time, on each digital signal stream one bit at a time in a time multiplexing manner;

(2a) storing a context for each digital signal stream, which context indicates the next state of execution of the framing algorithm for the digital signal stream;

(3a) switching the contexts of the plurality of digital signal streams; and (4a) repeating steps (1a) to (3a) for each digital signal stream.

14. The method according to claim 11 wherein the set of algorithms includes a mapping algorithm of the state machine type.

15. In a telecommunications system in which a plurality of synchronously time division multiplexed digital signal streams are processed to convert between two levels of a digital signal hierarchy according to an algorithm, a context switching apparatus for performing the execution of the algorithm for each of the plurality of digital signal streams, comprising:

an algorithmic logic block for executing the algorithm on each digital signal stream one bit at a time in a time multiplexing manner;

a memory for storing a context for each digital signal stream which indicates the next state of execution of the algorithm for the digital signal stream at a specific instance of execution; and a controller for switching the contexts of the plurality of digital signal streams.

16. The context switching apparatus according to claim 15 wherein there is a set of algorithms to be performed on each of the plurality of digital signal streams, comprising:

an algorithmic logic block for performing the set of algorithms on each digital signal stream one bit at a time in a time multiplexing manner; and a memory for storing contexts for each digital signal stream which indicate the next states of execution of the set of the algorithms and each of the algorithms for the digital signal stream at a specific instance of execution.

17. The context switching apparatus according to claims 16 wherein the set of algorithms performs functions of terminating each of the plurality of digital signal streams, further comprising:

the algorithmic logic block to be executed on each digital signal stream one bit at a time in a time multiplexing manner including a framing logic block for framing the digital signal stream;

a context memory for storing a context for each digital signal stream which indicates the next state of execution of the framing logic block for the digital signal stream at a specific instance of execution; and a controller for switching the contexts of the plurality of digital signal streams.

18. The context switching apparatus according to claim 16 further comprising:

buffers provided at inputs and outputs of the context switching apparatus for buffering each of the plurality of digital signal streams so that the signal streams are fed to the context switching apparatus in a proper time multiplexed manner.

* * * * *